United States Patent
Tung et al.

(10) Patent No.: US 7,836,334 B2
(45) Date of Patent: Nov. 16, 2010

(54) TRANSFER CONTROL METHOD

(75) Inventors: Chien-Hsun Tung, Taichung (TW);
Ying-Che Hung, Taipei Hsien (TW);
Yao-Chun Fang, Tainan County (TW);
Ching-Wen Hsueh, Luodong Township, Yilan County (TW)

(73) Assignee: Mediatek Inc., Hsin-Chu (TW)

( * ) Notice: Subject to any disclaimer, the term of this patent is extended or adjusted under 35 U.S.C. 154(b) by 559 days.

(21) Appl. No.: 11/620,757

(22) Filed: Jan. 8, 2007

(65) Prior Publication Data
US 2008/0165646 A1    Jul. 10, 2008

(51) Int. Cl.
*G06F 11/00*    (2006.01)
(52) U.S. Cl. .............................. 714/8; 714/54
(58) Field of Classification Search ............ 714/8, 714/53, 54
See application file for complete search history.

(56) References Cited

U.S. PATENT DOCUMENTS

| | | | |
|---|---|---|---|
| 5,146,577 A * | 9/1992 | Babin ........................... 711/167 |
| 5,359,582 A | 10/1994 | Kim | |
| 5,499,252 A | 3/1996 | Watanabe | |
| 5,715,452 A * | 2/1998 | Mori et al. ................... 707/201 |
| 5,764,881 A * | 6/1998 | Yoshida ......................... 714/8 |
| 6,009,542 A * | 12/1999 | Koller et al. .................. 714/53 |
| 6,119,260 A | 9/2000 | Tomisawa et al. | |
| 6,182,240 B1 * | 1/2001 | Mine ............................. 714/5 |
| 6,526,522 B1 * | 2/2003 | Park et al. ...................... 714/8 |
| 6,675,343 B1 | 1/2004 | Suzuki et al. | |
| 6,751,757 B2 * | 6/2004 | Biskup et al. ................. 714/54 |
| 6,766,465 B2 * | 7/2004 | Harada ........................... 714/2 |
| 6,842,580 B1 * | 1/2005 | Ueda et al. ................... 386/125 |
| 6,940,796 B2 * | 9/2005 | Ariyama ................... 369/53.17 |
| 6,993,679 B2 * | 1/2006 | George .......................... 714/8 |
| 6,999,386 B2 * | 2/2006 | Sugimoto et al. ........ 369/30.22 |

\* cited by examiner

*Primary Examiner*—Yolanda L Wilson
(74) *Attorney, Agent, or Firm*—Thomas, Kayden, Horstemeyer & Risley (57) ABSTRACT

A system for transferring data read from a data storage medium. The system comprises a memory unit, a controller, a memory management logic, and an output interface. The memory unit stores the data. The controller compares at least one address of the data with at least one defect address and generates a defect notification signal indicating the comparison result. The memory management logic calculates the amount of the data stored in the memory unit for transfer and generates a calculation signal according to the amount of the data and the defect notification signal received from the controller. The output interface retrieves the data from the memory unit and transfers the retrieved data according to the calculation signal received from the memory management logic.

7 Claims, 7 Drawing Sheets

TRANSFER CONTROL METHOD

BACKGROUND OF THE INVENTION

1. Field of the Invention

The invention relates to disc drive systems, and more specifically to systems and methods preventing invalid data from transfer.

2. Description of the Related Art

Optical discs, widely used due to advantages of large capacity and convenience, include read-only discs such as CD-ROM and DVD-ROM, writeable discs such as CD-R and DVD-R, and rewritable discs such as CD-RW, DVD-RAM and DVD+RW.

Generally, when disc drives transfer data from optical discs to a host computer, the validity of data is verified in terms of error correction and according to defect information of the optical disc, with transfer stopped if the data is invalid. In the case of defective information, the physical target address of optical discs is compared to the defect addresses in a defect list identifying defective sectors of optical discs. If the physical target address matches any of the defect addresses of the defect list, reproduction is interrupted and the pick-up head of the drive seeks correct data with the replacement sector address of the defect list corresponding to the matching defect address. This, however, slows reproduction and degrades system performance. In the case of error correction, before transferring data read from optical discs to the host computer, a code error correction process is performed on the data in a decoder of disc drives according to an error detection code (EDC) of the data. Code error detection process is then followed using an error correction code (ECC) of the data to verify the correction of data. Error correction and detection are repeated until the ECC represents no code error in the data. This, however, lowers system speed. Hence, it is advantageous to obtain a data reproduction method overcoming the above problems.

BRIEF SUMMARY OF THE INVENTION

A detailed description is given in the following embodiments with reference to the accompanying drawings.

The invention is generally directed to systems and methods for transferring data read from a data storage medium to a host computer. An exemplary embodiment of a system for transferring data read from a data storage medium comprises a memory unit, a controller, a memory management logic, and an output interface. The memory unit stores the data. The controller compares at least one address of the data with at least one defect address and generates a defect notification signal indicating the comparison result. The memory management logic, coupled to the controller and the memory unit, calculates the amount of data stored in the memory unit for transfer and generates a calculation signal according to the amount of data and the defect notification signal received from the controller. The output interface retrieves the data from the memory unit and transfers the retrieved data according to the calculation signal received from the memory management logic.

A method of transferring data stored in a data storage media to a host computer is provided. The method comprises reading the data from the data storage media, calculating the data available for transfer to the host computer, transferring the data to the host computer according to the calculation result, comparing at least one address of the data for transfer with at least one defect address to assert a defect notification signal if the address of the data matches the at least one defect address, and stopping calculating the data in response to the defect notification signal, indicating no data is available for transfer, interrupting the transfer.

A system for transferring data read from a data storage medium is provided. The system comprises a memory it and an output interface. The memory it stores the data comprising a stop flag. The output interface retrieves the data from the memory unit and transfers the retrieved data according to the stop flag thereof.

Further, a method of transferring data stored in a data storage media to a host computer is provided. The method comprises reading the data from the data storage media, setting a stop flag for the data, and determining whether to transfer the data to the host computer according to the stop flag thereof.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
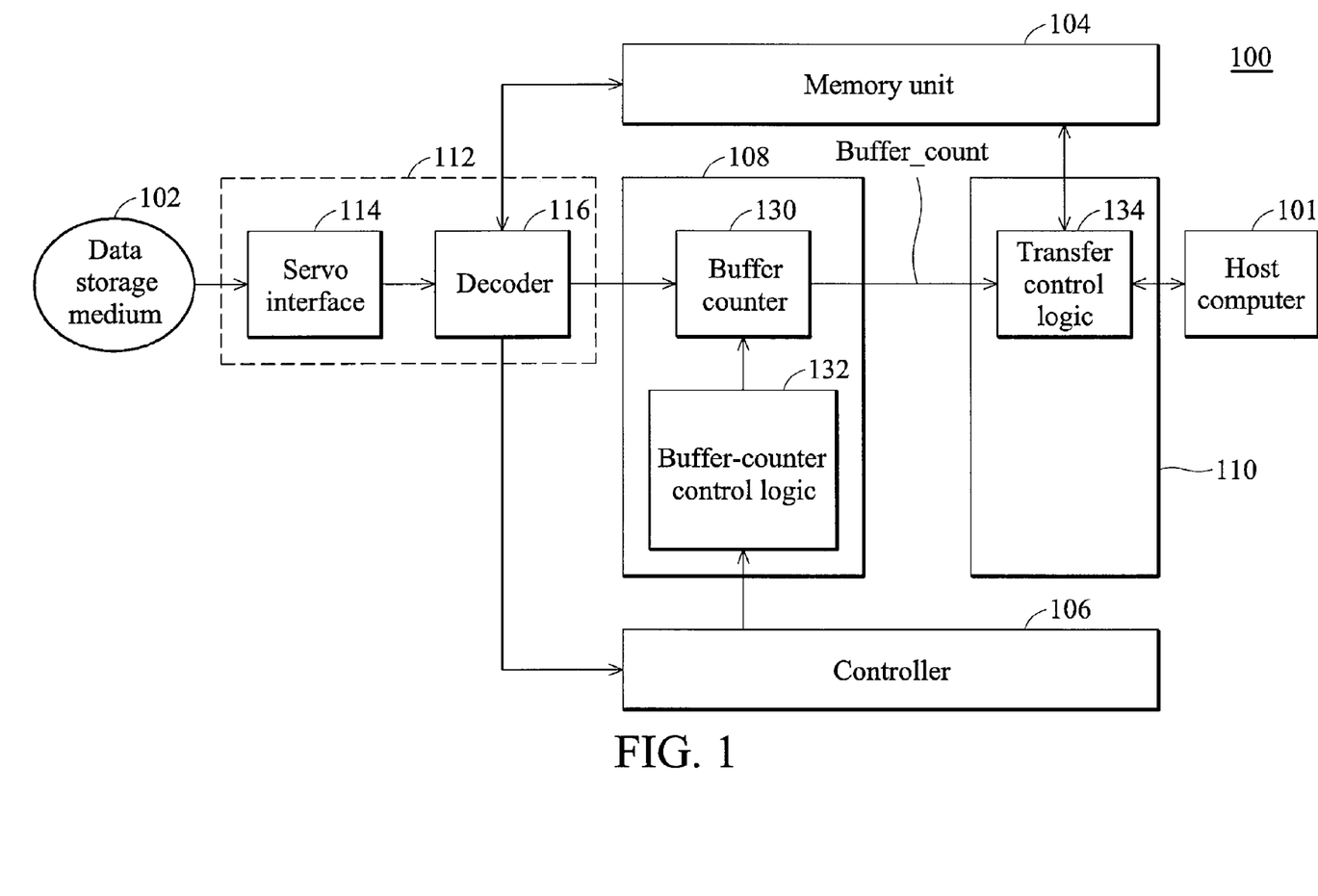
FIG. 1 is a schematic diagram of a system for transferring data stored in a data storage medium according to an embodiment of the invention.

FIG. 1 is a schematic diagram of a system 100 for transferring data read from a data storage medium 102, such as DVD or CD, to a host computer 101 according to an embodiment of the invention, wherein the system is generally an optical disk drive system such as Blu-Ray drive, HDDVD drive, DVD drive or CD drive. The system 100 comprises a memory unit 104, a controller 106, a memory management logic 108, an output interface 110, and a front-end unit 112. The front-end unit 112 comprises a servo interface 114 and a decoder 116. The servo interface 114 reads data from the sectors of the data storage medium 102. The decoder 116 then decodes data from the servo interface 114 and stores decoded data in the memory unit 104. The output interface 110 comprising a transfer control logic 134 retrieves data stored in the memory unit 104 and transfers the retrieved data to the host computer 101. The controller 106, coupled to the decoder 116 and the memory management unit 108, receives a defect list of the data storage medium 102 identifying defect addresses, that is the physical addresses of the defective sectors of the data storage medium 102, and replacement sector addresses thereof if any, from the decoder 116. The controller 106 then compares the defect addresses with the data address of a current sector being read of the data storage medium 102 and generates a defect notification signal indicating the comparison result to the memory management logic 108. The memory management logic 108, coupled to the decoder 116, calculates the amount of the data stored in the memory unit 108 available for transfer, wherein the calculation value thereof increases when the decoder 116 stores data in the memory unit 104 and generates a calculation signal Buffer_count in accordance with the defect notification signal and the calculation result, allowing the transfer control logic 134 to transfer data to the host computer 101 accordingly. The memory management logic 108 comprises a buffer counter 130 and buffer-counter control logic 132. The buffer counter 130 increases when the decoder 116 stores data in the memory unit 104, indicating the amount of data available for transfer. The buffer-counter control logic 132 receives the defect notification signal from the controller 106 and controls the calculating of the buffer counter 130 accordingly. If the controller 106 determines that a defect address matches the address of the data of the current sector being read, the buffer-counter control logic 132 allows the buffer counter 130 to stop calculating in response to the defect notification signal and the calculation signal Buffer_count generated therefrom is masked accordingly, indicating no data is available for transfer. Thus, the transfer control logic 134 receives the calculation signal Buffer_count and determines not to transfer the data of the current sector to the host computer 101. In this way, data read from the defective sectors of the data storage medium 102 is prevented from transfer to the host computer 101. Once the transfer is stopped, the system 100 performs a linear replacement algorithm operation to obtain correct data from the data storage medium 102 with the replacement sector address contained in the defect list with respect to the matched defect address and then stores the correct data in the memory unit 104.

Figure 2:
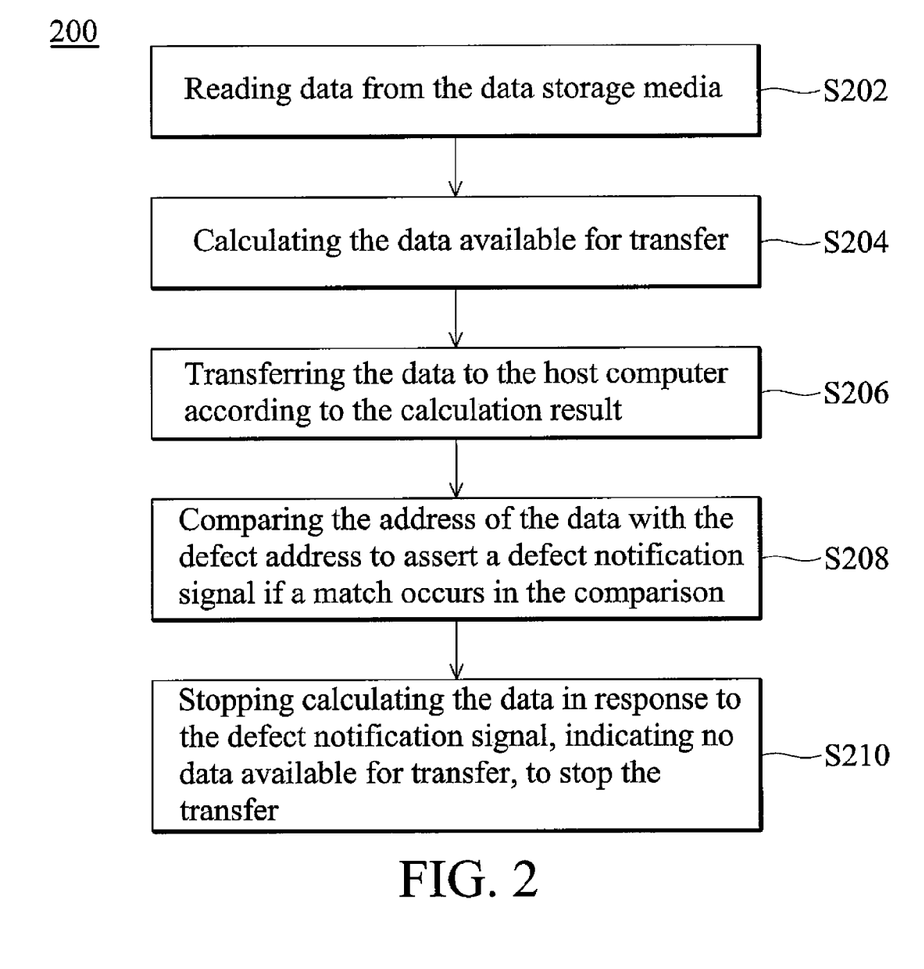
FIG. 2 is a flowchart of a method of transferring data stored in a data storage media to a host computer according to another embodiment of the invention.

FIG. 2 is a flowchart of a method 200 of transferring data stored in a data storage media to a host computer according to an embodiment of the invention. In step S202, data is read from the sectors of the data storage media. The data available for transfer to the host computer is then calculated in step S204. Proceeding to step S206, the data is transferred to the host computer according to the calculation result in step S204. Step S208 follows, in which at least one address of the data for transfer is compared with at least one defect address to assert a defect notification signal if the address of the data matches the at least one defect address, wherein the defect address identifies the physical addresses of defective sectors of the data storage medium. In step S210, calculating the data is stopped, and indicating no data is available for transfer if the address of the data for transfer matches the at least one defect address. The transfer of data to the host computer is stopped accordingly. In this way, data read from defective sectors of the data storage medium is not transferred to the host computer.

Figure 3:
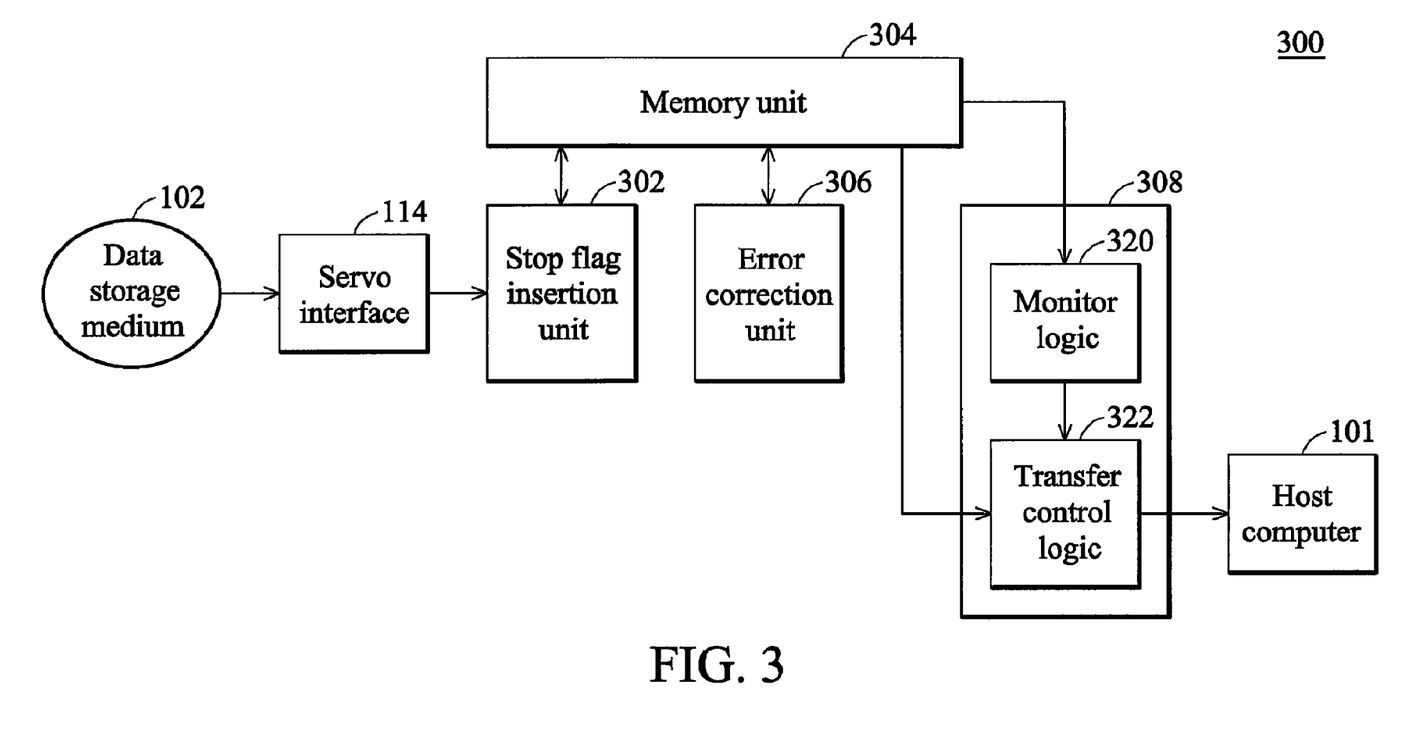
FIG. 3 is a schematic diagram of a system for transferring data read from a data storage medium according to another embodiment of the invention.

FIG. 3 is a schematic diagram of a system 300 for transferring data read from a data storage medium 102 to a host computer 101 according to another embodiment of the invention. The system 300 comprises a servo interface 114, a stop flag insertion unit 302, a memory unit 304, an error correction unit 306, and an output interface 308. The stop flag insertion unit 302 obtains data read from the data storage medium 102 via the servo interface 114 and stores the obtained data in the memory unit 304. The stop flag insertion unit 302 further checks the validity of the obtained data according to a defect list of the data storage medium 102 identifying defect addresses, the physical addresses of the defective sectors of the data storage medium 102, and replacement sector addresses thereof if any, to insert a stop flag in the data, indicating whether the data is read from a defective sector of the data storage medium 102, and then writes the data with the stop flag in the memory unit 304. Thus, the validity of the data is verified according to the stop flag thereof before transferring data stored in the memory unit 302 by the output interface 308. If the stop flag thereof indicates the data is invalid, the data will not be transferred. Thus, corrupted data read from defective sectors of the data storage medium 102 is not transferred to the host computer 101.

Figure 4A:
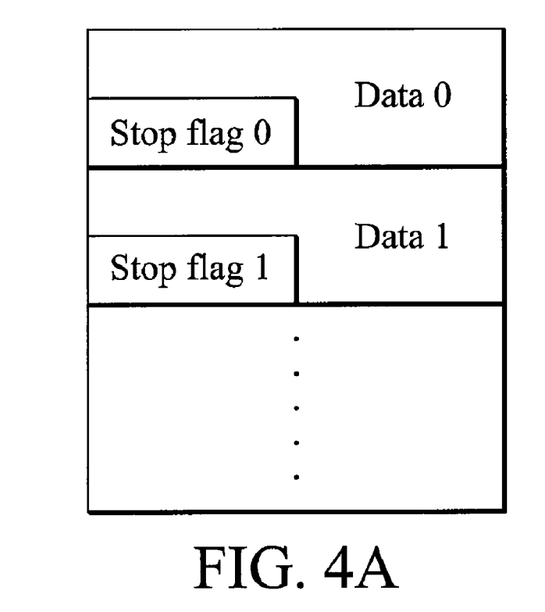
FIGS. 4A and 4B are schematic diagrams of stop flag arrangements of the system in FIG. 3.
Figure 4B:
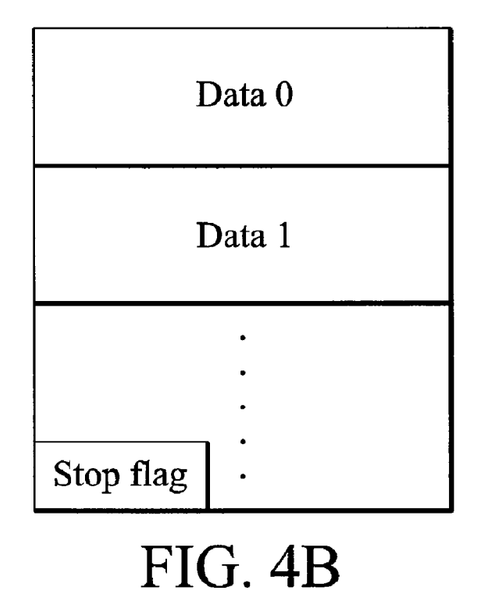

The output interface 308 comprises a monitor logic 320 and a transfer control logic 322. The monitor logic 320, coupled to the memory unit 304, retrieves the stop flag of the data and generates a transfer control signal, indicating the validity of the data according the value of the stop flag. The transfer control logic 322 reads the data from the memory unit 304 and determines whether to transfer the data to the host computer 101 in response to the transfer control signal from the monitor logic 320. If the data is invalid according to the stop flag thereof, the transfer control logic 322 stops transferring the data. It is noted the stop flag may be inserted with respect to each data shown in FIG. 4A, wherein data 0 comprises a stop flag 0 and data 1 comprises a stop flag 1. Alternatively, the stop flag may be inserted with respect to a data set as shown in FIG. 4B, wherein the stop flag comprises validity information with respect to data 0, data 1 and so on.

Figure 5:
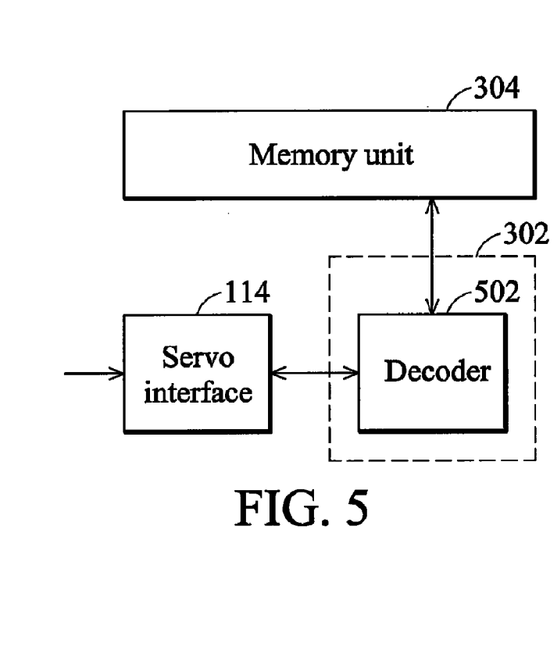
FIG. 5 shows an exemplary stop flag insertion unit in FIG. 3.

FIG. 5 shows an exemplary stop flag insertion unit 302 of the FIG. 3. As shown, the stop flag insertion unit 302 comprises a decoder 502. The decoder 502 obtains the data from the sectors of the data storage medium 102 via the servo interface 114 to decode the obtained data. The decoder 502 then compares the physical address of the decoded data of sectors with defect addresses contained in the defect list. After comparison, the decoder inserts the stop flag indicating the comparison result in the decoded data and writes the decoded data with the stop flag in the memory unit 304. The output interface 308 in FIG. 3 then retrieves the stop flag from the data stored in the memory unit 304 and determines not to transfer the data if the stop flag thereof indicates the address of the data matches a defect address.

Figure 6:
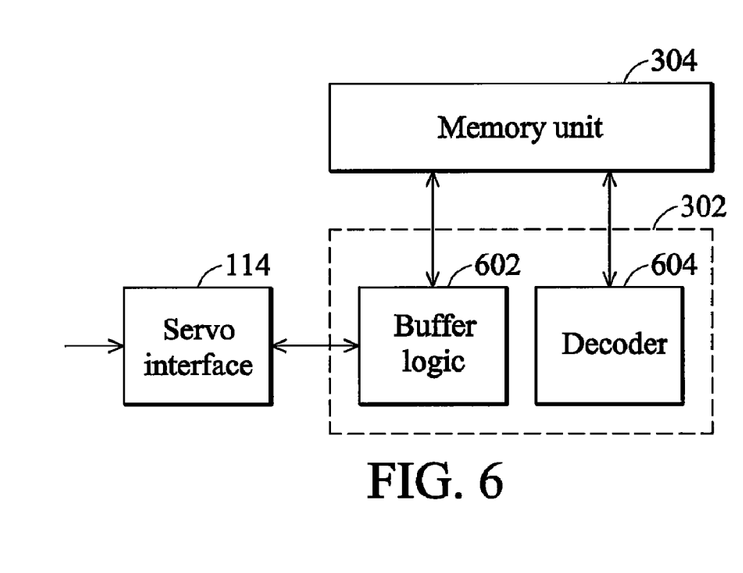
FIG. 6 shows another exemplary stop flag insertion unit in FIG. 3.

FIG. 6 shows another exemplary stop flag insertion unit 302 of the FIG. 3. As shown, the stop flag inserting unit 302 comprises a buffer logic 602 and a decoder 604. The buffer logic 602 buffers the data from the servo interface 114 and compares the physical addresses of the data of the sectors of the data storage medium 114 with defect addresses contained in the defect list to insert a stop flag therein accordingly. The buffer logic 602 then stores the data with the stop flag in the memory unit 304. The decoder 604 obtains the data from the memory unit 304, decodes the obtained data, and writes the decoded data to the memory unit 304. Similarly, with the stop flag of the data set by the buffer logic 602 indicating the comparison result, the output interface determines whether to transfer the data. Hence, the data read from defective sectors of the data storage medium 102 is not transferred.

Moreover, the stop flag of data may contain code error information with respect to the data. The error correction unit 306 obtains the data stored in the memory unit 304 and performs a code error correction on the data. The error correction unit 306 then computes an error detection code (EDC) of the corrected data, determines the value of stop flag according to the EDC of the corrected data, and stores the data with the stop flag in the memory unit 304 In this way, the output interface 308 determines whether to transfer the data according to the stop flag thereof. If the stop flag indicates there is code error in the data, the transfer is stopped accordingly by the output interface 308.

Figure 7:
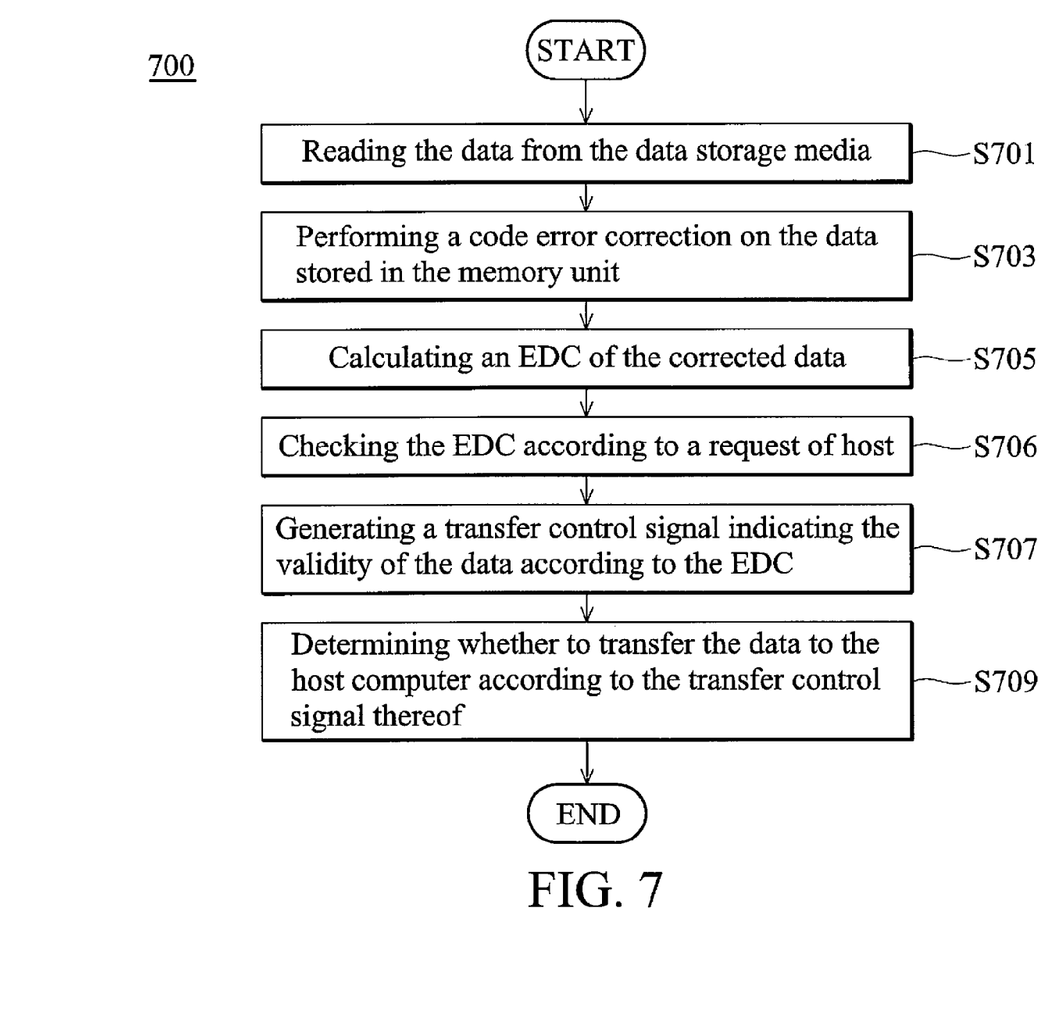
FIG. 7 is a flowchart of a method of transferring data stored in a data storage media to a host computer according to an embodiment of the invention.

FIG. 7 is a flowchart of a method 700 of transferring data stored in a data storage media to a host computer according to an embodiment of the invention. In step S701, data is read from the sectors of the data storage media. Next, the error correction unit 306 obtains the data stored in the memory unit 304 and performs a code error correction on the data (step S703). The error correction unit 306 then calculates the EDC of the corrected data and stores the data with the EDC in the memory unit 304 (step S705). Next, the monitor logic 320 retrieves the EDC of the data and checks the EDC according to a request of host (step S706), and generates a transfer control signal indicating the validity of the data according to the value of the EDC (step S707). For example, if the host requests a first plurality of data from the memory unit 304, the monitor logic 320 only retrieves and checks the corresponding EDC of the first plurality of data. Next, the transfer control logic 322 reads the data from the memory unit 304 and determines whether to transfer the data to the host computer 101 in response to the transfer control signal from the monitor logic 320 (step S709). If the data is invalid according to the EDC thereof, the transfer control logic 322 stops transferring the data.

Figure 8:
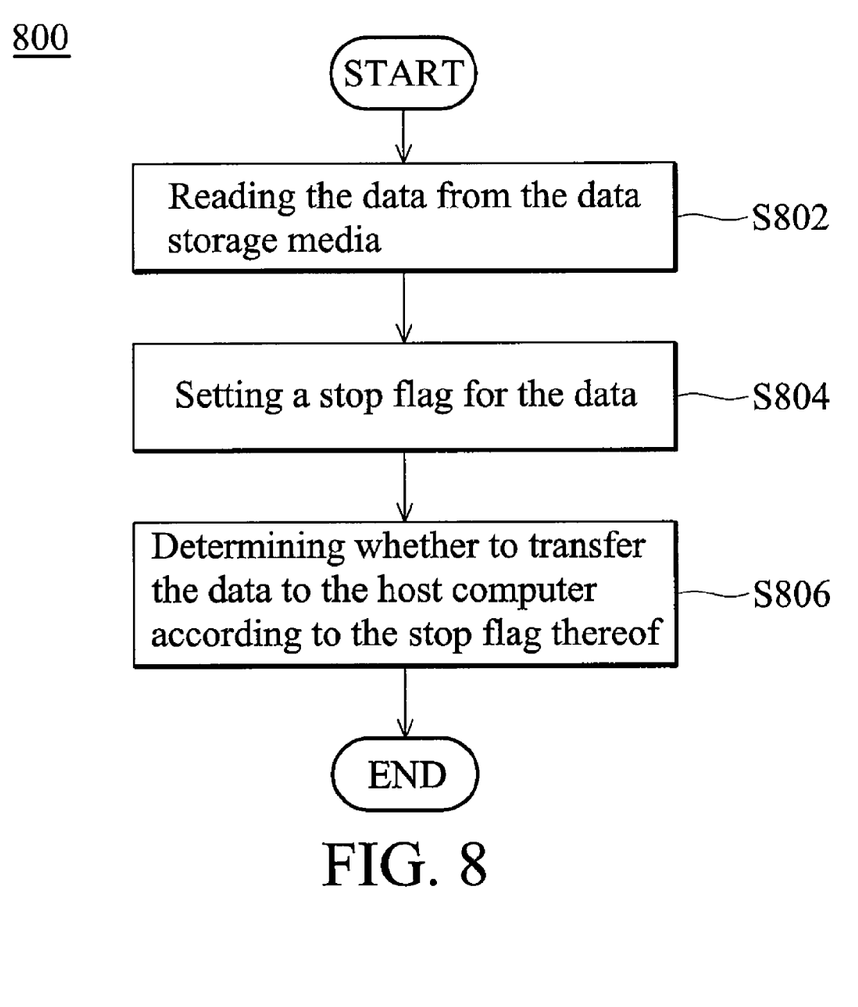
FIG. 8 is a flowchart of a method of transferring data stored in a data storage media to a host computer according to another embodiment of the invention.

FIG. 8 is a flowchart of a method 800 of transferring data stored in a data storage media to a host computer according to another embodiment of the invention. In step S802, data is read from the sectors of the data storage media. The stop flag for the data is then set in step S804, wherein the stop flag may be set according to defect information of the data storage medium or error detection information thereof. In the case of defect information, the addresses of the data of the sectors are compared with defect addresses contained in a defect list of the data storage medium identifying physical addresses of defective sectors thereof, and the stop flag is set according to the comparison result. In the case of error detection information, a code error correction process is performed on the data. An error detection code of the data is then computed and set as the stop flag for the data. Proceeding to step S806, transfer of data to the host computer is then determined in accordance with the stop flag thereof. If the stop flag of the data indicates the data is data read from defective sectors of the data storage medium and thus invalid, the transfer is stopped. Once the transfer of data is stopped because the data is read from defective sectors, a linear replacement algorithm is performed to obtained correct data in a corresponding replacement sector address.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for transferring data read from a data storage medium, comprising:
    a memory unit storing the data;
    a controller comparing at least one address of the data with at least one defect address and generating a defect notification signal indicating the comparison result;
    a memory management logic coupled to the controller and the memory unit, comprising:
        a buffer counter calculating the amount of the data available for transfer to generate the calculation signal to the output interface; and
        a buffer-counter control logic coupled to the buffer counter, receiving the defect notification signal from the controller, and controlling the calculation of buffer counter according to the defect notification signal by masking the calculation signal in response to the defect notification signal indicating the address of the data matches the at least one defect address; and
    an output interface retrieving the data from the memory unit and transferring the retrieved data according to the calculation signal received from the memory management logic.

2. The system as claimed in claim 1, further comprising a front-end unit coupled to the memory management logic and the memory unit, reading the data from the data storage medium to store the data in the memory unit, wherein the calculation of the memory management logic increases when the front-end unit stores the data in the memory unit.

3. The system as claimed in claim 1, wherein the memory management logic prevents the output interface from transferring the data with the calculation signal if the defect notification signal generated by the controller indicates the address of the data matches the at least one defect address.

4. The system as claimed in claim 3, wherein the controller performs a linear replacement algorithm operation when the output interface stops transferring the data.

5. The disc drive system as claimed in claim 1, wherein the output interface comprises a transfer control logic determining whether to transfer the data according to the calculation signal.

6. A method of transferring data stored in a data storage media to a host computer, comprising:
    reading the data from the data storage media;
    calculating the data available for transfer to the host computer;
    transferring the data to the host computer according to the calculation result;
    comparing at least one address of the data for transfer with at least one defect address to assert a defect notification signal if the address of the data matches the at least one defect address; and
    stopping the calculation of the data and masking the calculation result in response to the defect notification signal indicating no data available for transfer to stop the transfer of data to the host computer.

7. The method as claimed in claim 6, further comprising performing a linear replacement algorithm operation if the defect notification signal is asserted.

* * * * *